United States Patent
Atsuumi et al.

(10) Patent No.: US 7,154,651 B2
(45) Date of Patent: Dec. 26, 2006

(54) OPTICAL SCANNING DEVICE AND IMAGING APPARATUS IMPLEMENTING THE SAME

(75) Inventors: Hiromichi Atsuumi, Kanagawa (JP); Yoshinori Hayashi, Kanagawa (JP); Naoki Miyatake, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/146,106

(22) Filed: Jun. 7, 2005

(65) Prior Publication Data
US 2005/0225819 A1 Oct. 13, 2005

Related U.S. Application Data

(62) Division of application No. 10/421,786, filed on Apr. 24, 2003.

(30) Foreign Application Priority Data
May 1, 2002 (JP) .............................. 2002-129741

(51) Int. Cl.
*G02B 26/08* (2006.01)
(52) U.S. Cl. .................. 359/204; 359/196; 359/205
(58) Field of Classification Search ................ 359/196, 359/205, 204, 223–226
See application file for complete search history.

(56) References Cited

U.S. PATENT DOCUMENTS

| 6,144,477 | A | 11/2000 | Takeuchi |
| 6,509,995 | B1 * | 1/2003 | Suzuki et al. ............... 359/196 |
| 6,596,985 | B1 * | 7/2003 | Sakai et al. ................ 250/234 |
| 6,697,183 | B1 | 2/2004 | Atsuumi et al. |
| 6,771,407 | B1 | 8/2004 | Hayashi et al. |
| 6,781,729 | B1 | 8/2004 | Suzuki et al. |
| 6,937,371 | B1 | 8/2005 | Hayashi et al. |
| 2002/0114051 | A1 | 8/2002 | Atsuumi |
| 2005/0225819 | A1 | 10/2005 | Atsuumi et al. |

FOREIGN PATENT DOCUMENTS

| JP | 08-292388 | 11/1996 |
| JP | 10-020225 | 1/1998 |
| JP | 2761723 | 3/1998 |
| JP | 2804647 | 7/1998 |

OTHER PUBLICATIONS

U.S. Appl. No. 11/146,106, filed Jun. 7, 2005, Atsuumi et al.
U.S. Appl. No. 11/223,051, filed Sep. 12, 2005, Hayashi et al.
U.S. Appl. No. 11/411,072, filed Apr. 26, 2006, Miyatake.

* cited by examiner

*Primary Examiner*—Drew A. Dunn
*Assistant Examiner*—Joshua L. Pritchett
(74) *Attorney, Agent, or Firm*—Oblon, Spivak, McClelland, Maier & Neustadt, P.C.

(57) ABSTRACT

A multi-beam optical scanning device is disclosed that includes a light source emitting a bundle of rays, a first optical system coupling the rays into diverging rays, a second optical system condensing the diverging rays into linear rays extending in the main scanning direction, a light deflector deflecting the linear rays, and a third optical system condensing the deflected rays onto a scanning surface. The second and third optical systems include resin imaging elements. At least one resin imaging element of the second optical system has a negative power in a sub scanning direction and a surface configuration that is arranged to effectively compensate for a change in field curvature caused by a temperature change in a support member of the first optical system or the resin imaging element of the third optical system. The second optical system as a whole has a positive power in the main scanning direction.

11 Claims, 10 Drawing Sheets

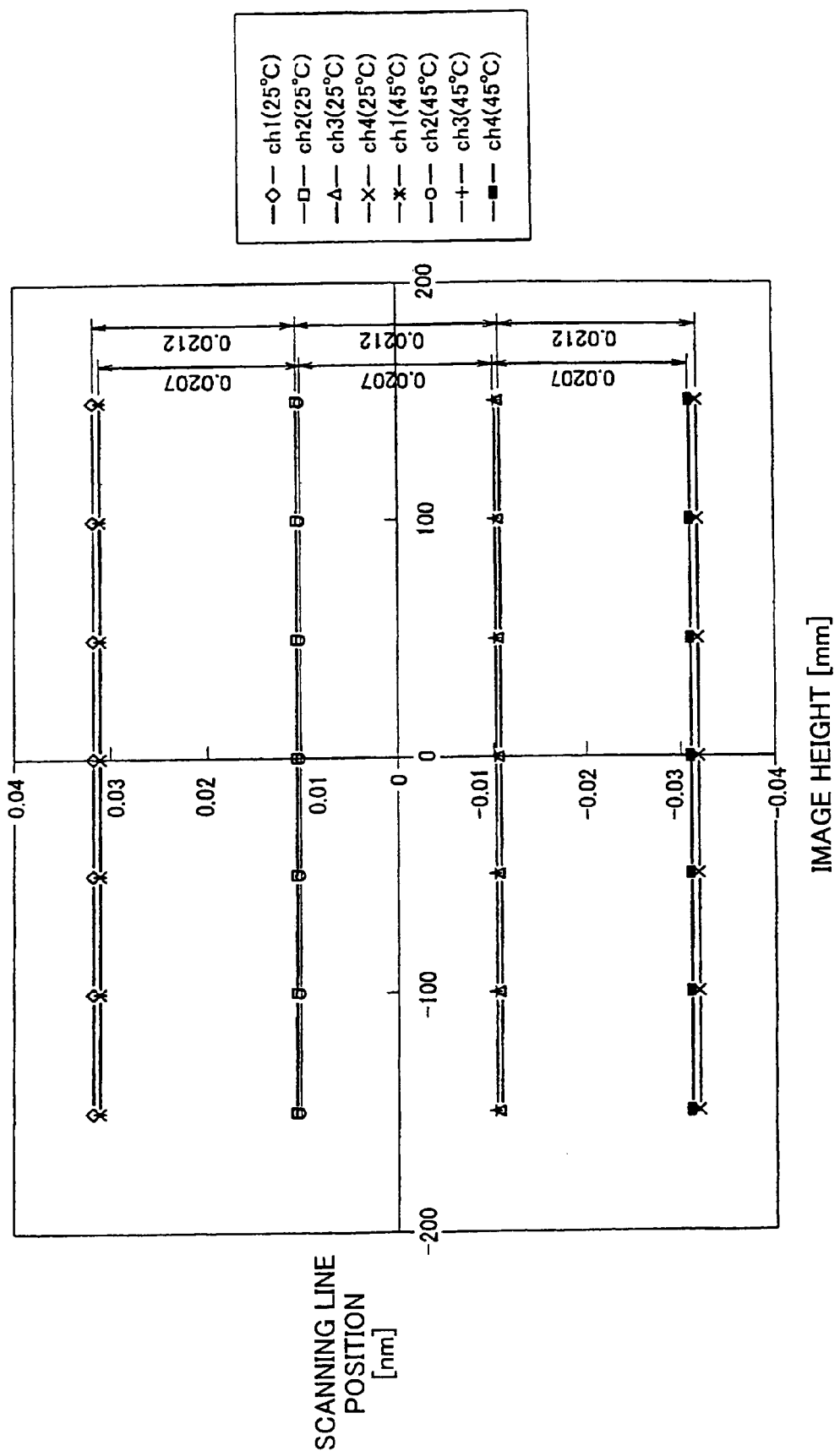

PARALLEL RAYS

DIVERGING RAYS

OPTICAL SCANNING DEVICE AND IMAGING APPARATUS IMPLEMENTING THE SAME

CROSS REFERENCE TO RELATED APPLICATIONS

This application is a division of application Ser. No. 10/421,786, filed Apr. 24, 2003, the entire contents of which are incorporated herein by reference. This application claims priority and contains subject matter related to Japanese Patent Application No. 2002-129741 filed in the Japanese Patent Office on May 1, 2002, the entire contents of which are hereby incorporated herein by reference.

BACKGROUND OF THE INVENTION

1. Field of the Invention

The present invention relates generally to an optical scanning device and an imaging apparatus implementing this optical scanning device, and particularly to a multi-beam optical scanning device that simultaneously scans a surface to be scanned such as a photoconductor using a plurality of light beams so as to significantly increase recording speed, this multi-beam optical scanning device being suitable for use in a write system of a recording device such as a digital copier, a laser printer, or a laser facsimile.

2. Description of the Related Art

One known method of increasing the recording speed of an optical scanning device implemented in a write system of a recording device such as a laser printer or a laser facsimile is a method of increasing the rotation speed of a polygon mirror, which functions as a deflector. However, in this method, factors such as the durability of the motor, the noise, the oscillation, and the modulation speed of the semiconductor laser impose limitations on attempts at increasing the recording speed. Thus, a multi-beam optical scanning device that increases recording speed by simultaneously scanning a plurality of light beams to record a plurality of scanning lines at once is being proposed.

Also, technology for forming the scanning lens with resin is being developed in order to realize cost reduction and formation of a particular lens surface.

However, it is known that the change in the curvature radius or the refractive index due to a change in environmental temperature and the like is greater in a resin lens than in a lens made of glass. Thereby, in a multi-beam scanning optical system using the resin lens, the scanning line spacing for the plurality of scanning lines in the sub-scanning direction (referred to as 'beam pitch' hereinafter) is varied, causing image degradation such as unevenness in image density.

FIG. 1 is a diagram showing the light path of principal rays in the sub scanning direction in an optical scanning device according to the related art. In this optical scanning device, a glass coupling lens 102 and a glass cylindrical lens 104 are used as a first optical system and a second optical system, respectively. Also, a two-channel LDA (laser diode array) 101 is shown as a light source. Further, resin lenses 161 and 162 (scanning lens) make up a third optical system.

In the following, the change in the beam pitch in response to a change in temperature will be described.

First, a beam pitch P' on an image surface can be expressed by the following formula:

$$P' = P_0 \times Fcyl/Fcol \times \beta$$

wherein $P_0$ denotes the beam spacing in the sub scanning direction at the light source, Fcol denotes the focal length of the first optical system, Fcyl denotes the focal length of the second optical system, and $\beta$ denotes the lateral magnification in the sub scanning direction of the third optical system.

Since the change in $P_0$, Fcol, and Fcyl due to temperature change is trivial and can be disregarded, the change in the beam pitch can be described in conjunction with the change in the lateral magnification in the sub scanning direction of the third optical system made up of the resin lenses 161 and 162. That is, the change in the lateral magnification in the sub scanning direction of the third optical system due to temperature change is directly reflected in the change in the beam pitch. The light path indicated by dotted lines in FIG. 1 is the light path when the temperature is increased. That is, the beam pitch increases as a result of an increase in the temperature.

Also, in the optical scanning device, a bundle of rays emitted from a plurality of emission points is normally converted into a bundle of parallel rays via the coupling lens 102 (first optical system), and is formed into a line image that extends along the main scanning direction by the cylindrical lens 104 (second optical system), this being performed in the vicinity of a polygon mirror 105. The polygon mirror 105 deflects each bundle of rays that is emitted via the cylindrical lens 104, and scans this at a substantially isometric speed (constant linear velocity). The scanning lenses 161 and 162 of the third optical system form an image on a surface to be scanned 107 by condensing each bundle of rays deflected and scanned by the polygon mirror 105. However, in order to enhance flexibility in optical design, the bundle of rays emitted from a plurality of emission points is preferably converted into a bundle of diverging rays or convergent rays at the coupling optical system in accordance with the characteristics of the optical systems following the coupling optical system.

In the multi-beam optical scanning device, given that the emission point positions (emission point spacing) change by P1 under the influence of temperature change or a difference in the mounting of the light source device, the beam spacing at the surface to be scanned 107 changes (is degraded) by P, which can be expressed by the formula below:

$$P = P1 \times m \text{ (}m\text{: magnification in the sub scanning direction between the light source and the surface to be scanned)}$$

Thus, to obtain stable beam spacing in the sub scanning direction at the surface to be scanned 107, the magnification in the sub scanning direction between the light source and the surface to be scanned 107 is preferably low.

In turn, to lower the magnification in the multi-beam optical scanning device, the bundle of rays emitted from a plurality of emission points is preferably converted into a bundle of diverging rays at the coupling optical system.

When the bundle of rays emitted from a plurality of emission points is converted into a bundle of diverging rays via the coupling optical system, the principal rays of the bundle heading toward the same image height will be parallel (the field angles are equal). Herein, if the scanning lens has functions of imaging parallel rays, the surface to be scanned 107 will be adjusted to a focus point of the bundle of rays (imaging point of the diverging rays). However, the focus point of the bundle of rays and the intersecting point of the principal rays (the intersecting position of the parallel rays) do not meet at the same point. Thus, when the surface to be scanned 107 is adjusted to the focus point, a displacement of dots in the main scanning direction occurs. Also, since the image height at the start of writing and the image height at the end of writing form different angles at the deflection surface of the deflector (e.g. reflection angle of the polygon mirror), the write width (scanning width) of each beam is different and deviation between the beams is created. If the emission points are not spaced out in the main scanning direction (e.g. the emission points of the semiconductor laser array are arranged to be aligned in the sub scanning direction), the displacement of dots in the main scanning direction and the difference in the write width between each of the beams can be prevented. However, the above arrangement is difficult to realize since errors during the mounting of the devices and the like cannot be completely eliminated.

Also, in a case where the scanning lens (third optical system) has a function of imaging diverging rays, each bundle of rays is focused at the surface to be scanned 107. However, if the principal rays of each beam emitted from the different emission points are parallel, the rays intersect before reaching the surface to be scanned 107 (towards the deflector) and thus the image heights will differ at the surface to be scanned 107. Also, since the image height at the start of writing and the image height at the end of writing form different angles at the deflection surface of the deflector (e.g. reflection angle of the polygon mirror), the write width (scanning width) of each beam is different and deviation between the beams is created. Further, the difference in image heights will still exist even when the image height at the start of the writing is adjusted according to the image height at the end of writing.

As described above, when the bundle of rays that has passed through the coupling optical system is converted into diverging rays, degradation of the image such as unevenness in density or distortion of the vertical lines may occur due to the displacement of dots in the main scanning direction or the difference in the write width (scanning width) of each beam.

In recent years, technologies for increasing the density of the image reproduced by the digital copier or the laser printer have been developed, and with this continuing development, the miniaturization of the beam spot diameter on the photoconductor is in demand. However, as mentioned above, a resin lens induces a greater change in the curvature radius or the refractive index due to a change in environmental temperature and the like compared to a glass lens. When a field curvature is generated as a result of the above change in the curvature radius or the refractive index, the beam spot written on the photoconductor will be enlarged, leading to image degradation.

In Japanese Patent Laid-Open Publication No. 8-292388, an optical scanning device developed in response to the above described problems is disclosed. Since the change in the field curvature due to temperature change at the positive lens and the change in the field curvature due to temperature change at the negative lens are inverses (negatives) of each other, the optical scanning device according to this prior art invention is arranged to compensate for the change in field curvature by implementing a scanning resin lens and another resin lens having the inverse power of the scanning lens on the light path between the light source and the light deflector so that the change in field curvature caused by temperature change in the scanning lens is canceled out. However, the resin lenses implemented between the light source and the light deflector have no power in the main scanning direction and thus have no compensation capabilities for the change in field curvature in the main scanning direction caused by the temperature change of the resin scanning lens. Therefore, the enlargement of the beam spot diameter in the main scanning direction cannot be prevented in this prior art invention.

Also, in order to improve the shape of the beam spot in the sub scanning direction, compensation for wave aberration from the standpoint of wave optics needs to be considered as well as compensation for field curvature from the geometric-optical standpoint. In an optical scanning device disclosed in Japanese Patent Laid-Open Publication No. 8-292388, all resin lenses having a negative power are arranged to be plano-concave cylindrical lenses. However, as described in the preferred embodiments of this patent application, the curvature radii will be quite small at around 5 mm or 8 mm according to this prior art invention. Thereby, a higher level of processing precision and/or mounting precision will be required. The problem with this prior art invention is that the temperature compensating function is provided only on one surface of the lens.

Also, in a light beam scanning optical device disclosed in Patent Gazette Publication No. 2804647, the compensation for field curvature in the main scanning direction is realized by a resin lens that has a power opposite (negative) to the power of the scanning resin lens. However, for the sub scanning direction, the change in field curvature is controlled by restricting the mounting position of the scanning lens. With this arrangement, the flexibility in design will also be restricted. Further, this light beam scanning optical device compensates for the field curvature in the sub scanning direction by using a cylindrical resin lens that has a negative power. However, the temperature compensation function is only provided on one surface of the lens. (In the light beam scanning optical device claimed in claim 9 of the Patent Gazette Publication No. 2804647, one side of the lens having the negative power has an axially symmetric aspherical surface and the other side has a cylindrical surface, thereby providing negative powers to both surfaces; however, the axially symmetric aspherical surface is mainly for compensating for the field curvature in the main scanning direction and thus has weak power and the compensation for the field curvature in the sub scanning direction is mainly realized by the other cylindrical surface, which has the stronger power.) Therefore, the curvature radius of the cylindrical surface will be small, and a higher level of processing precision and mounting precision will be required.

Also, in a laser beam scanning optical device disclosed in Japanese Patent Laid-Open Publication No. 10-20225 or a scanning optical device disclosed in Patent Gazette Publication No. 2761723, the misplacement of the image formation position due to temperature change is compensated for by moving a collimator lens and the like towards the optical axis using a mechanical structure so as to adjust the image formation position mechanically. However, costs will be raised and the power consumption of the device will increase due to the extra parts required for the mechanical structure and a detector that detects the misplacement of the image formation position.

As described above, in the resin lens, the change in the curvature radius or the refractive index due to environmental temperature change is greater compared to a glass lens, and therefore, a field curvature is generated in the optical system that implements the resin lens and the beam spot diameter formed on the photoconductor is enlarged, resulting in image degradation. Various technologies for countering the above problem have been proposed in the prior art inventions; however, there have been no disclosures of an optical scanner device implementing a resin lens as the scanning lens that is capable of preventing the enlargement of a beam spot without requiring greater processing precision or mounting precision, and also without increasing costs by implementing additional mechanical parts or detection parts.

SUMMARY OF THE INVENTION

The present invention has been developed in response to the above described problems of the related art, and its object is to provide an optical scanning device that implements a resin lens having a power that is an inverse power of the scanning lens in an optical system placed before a deflector so that a change in the beam pitch due to environmental temperature change can be controlled even when a resin lens is used as a scanning lens.

Also, it is an object of the present invention to realize a reduction of costs and power consumption in an optical scanning device that converts a bundle of rays passing through a coupling optical system into diverging rays and lowers magnification in a sub scanning direction compared to the related art in which a displacement of dots in the main scanning direction or a difference in the write width (scanning width) of each beam are prevented, a misplacement of an image formation position is compensated for, and the image formation position is adjusted mechanically.

More specifically, a multi-beam optical scanning device according to the present invention includes:

a light source having a plurality of emission points that emit a bundle of rays;

a first optical system that couples the bundle of rays emitted from the light source;

a second optical system that condenses the bundle of rays emitted from the first optical system into a substantially linear state extending along a main scanning direction;

a light deflector that has a deflection surface arranged close to where the bundle of rays is condensed, wherein the bundle of rays is deflected by this deflection surface;

a third optical system that condenses the deflected bundle of rays onto a surface to be scanned as a plurality of light spots; wherein the third optical system has at least one resin imaging element;

the second optical system has at least one resin imaging element and at least one glass imaging element; and the power of each surface of the resin imaging element of the second optical system is arranged so that a change in beam pitch in a sub scanning direction caused by a temperature change in at least one of the first optical system and the third optical system satisfies a condition:

$$\Delta p' < 0.5/DPI \text{ (mm/°C.)}$$

wherein ΔP' denotes a measure of change in the sub scanning beam pitch on an image surface for every 1° C. temperature change (mm/° C.), and DPI denotes a write density (dots/inch).

Alternatively, a multi-beam optical scanning device according to the present invention includes:

a light source having a plurality of emission points that emit a bundle of rays;

a first optical system that couples the bundle of rays emitted from the light source into a bundle of diverging light rays;

a second optical system that condenses the bundle of rays emitted from the first optical system into a substantially linear state extending along the main scanning direction;

a light deflector that has a deflection surface arranged close to where the bundle of rays is condensed, wherein the bundle of rays is deflected by this deflection surface;

an aperture stop arranged between the first optical system and the light deflector a third optical system that condenses the deflected bundle of rays onto a surface to be scanned as a plurality of light spots; wherein the third optical system has at least one resin imaging element;

the second optical system has at least one resin imaging element and at least one glass imaging element; and the resin imaging element of the second optical system has a negative power in the sub scanning direction and a surface configuration that is arranged to effectively compensate for a change in field curvature caused by a temperature change in at least one of a support member of the first optical system and the resin imaging element in the third optical system.

Further, the resin imaging element of the second optical system of the above optical scanning device may have a negative power in the main scanning direction.

The second optical system as a whole may have a positive power in the main scanning direction.

The bundle of rays emitted from the second optical system may be a bundle of substantially parallel rays in the main scanning direction.

Also, a plurality of emission points of the light source may be spaced out in the main scanning direction.

The aperture stop may be arranged between the first optical system and the second optical system and may be arranged to satisfy a condition:

$$L1 < L2$$

wherein L1 denotes a distance from an optical element of the first optical system that is closest to the light deflector to the aperture stop, and L2 denotes a distance from the aperture stop to an optical element of the second optical system closest to the light source.

Additionally, the resin imaging element of the second optical system may have at least two surfaces that have negative powers in the sub scanning direction, the surfaces being configured to effectively compensate for the change in field curvature caused by a temperature change in at least one of a support member of the first optical system and the resin imaging element of the third optical system.

The second optical system may have at least two resin imaging elements that have negative powers in the sub scanning direction.

Further, the light source is preferably a laser diode array that has a plurality of emission points.

The imaging element of the second optical system that has the power in the sub scanning direction is preferably positioned so as to allow a beam waist (minimum beam spot size) in the sub scanning direction to be positioned substantially on the surface to be scanned.

Further, the imaging element of the second optical system may only have the power in the sub scanning direction.

The imaging element of the second optical system that has the power in the main scanning direction is preferably positioned so as to allow a beam waist in the main scanning direction to be positioned substantially on the surface to be scanned.

The above imaging element of the second optical system may only have the power in the main scanning direction.

According to another aspect, the present invention is an imaging apparatus that implements the above described optical scanning device.

BRIEF DESCRIPTION OF THE DRAWINGS

FIG. 4 shows the relationship between image height and scanning line position in the optical scanning device of the present invention shown in FIG. 2B;

DESCRIPTION OF THE PREFERRED EMBODIMENTS

In the following, preferred embodiments of the present invention are described with reference to the accompanying drawings.

Figure 2A:
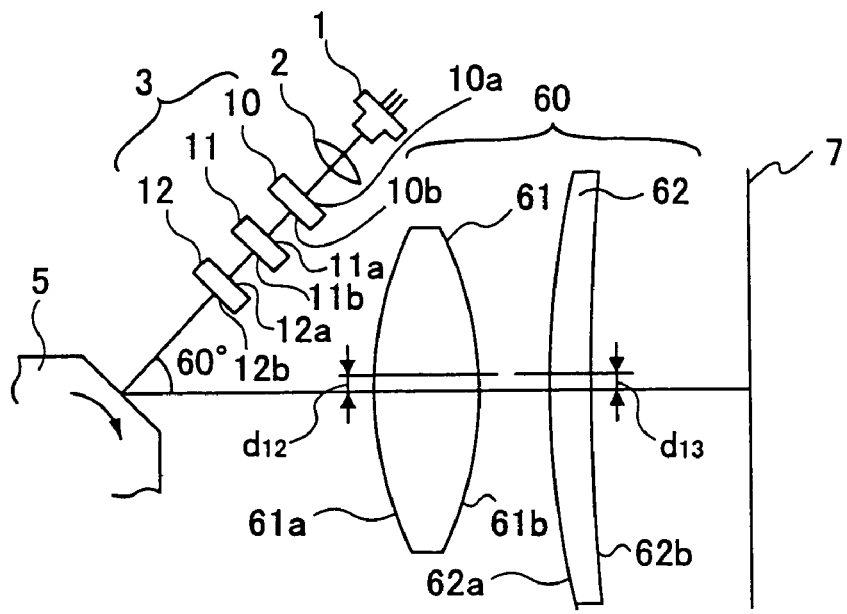
FIGS. 2A and 2B show an optical scanning device according to an embodiment of the present invention.
Figure 2B:
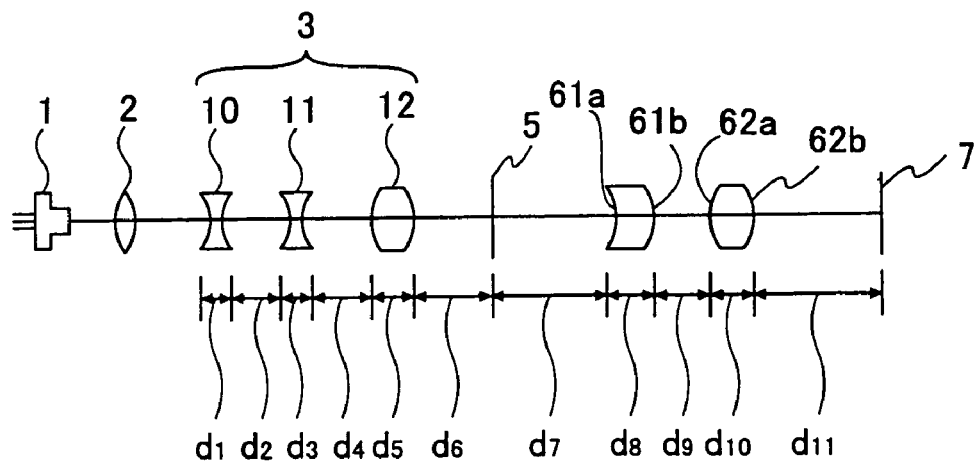

FIGS. 2A and 2B are diagrams illustrating an optical scanning device according to a first embodiment of the present invention, wherein FIG. 2A is a schematic diagram of the optical scanning device, and FIG. 2B is a side view (optical path) diagram of the same optical scanning device. In this embodiment, a plurality of light ray bundles emitted from a light source 1 are coupled into a desired state by means of a coupling lens 2 (first optical system). Herein, the rays are coupled into substantially parallel (or collimated) rays. Also, in this example, a LDA (laser diode array) having a plurality of emission points is used as the light source 1. The light source 1 may also be a plurality of laser diodes that emit multi-beam light synthesized by a prism.

By using a plurality of light sources as described above, the rotation speed of a light deflector can be lowered, thereby extending the life and reducing the power consumption of the optical scanning device.

As for the coupling lens 2, a single aspherical lens may be used. The wave aberration of the coupling lens on its own can be suitably compensated for. The bundle of rays emitted from the coupling lens 2 is incident on a resin lens 10. A surface of incidence 10a of the resin lens 10 has a spherical surface configuration that is provided with a negative power. Herein, the surface of incidence 10a may be a cylindrical surface that has a negative power only in the main scanning direction.

Next, the bundle of rays emitted from the resin lens 10 are incident on a glass toroidal lens 12 via a resin lens 11 that has a negative power only in the sub scanning direction. Then the bundle of rays is arranged into substantially parallel rays with respect to the main scanning direction and incident on a light deflector 5. With respect to the sub scanning direction, the bundle of rays is condensed substantially into a line extending along the main scanning direction at a deflection surface. Herein, the glass toroidal lens 12 may have a spherical surface and a cylindrical surface, or it may be an assemblage of a cylindrical lens and a spherical lens. Alternatively, the glass toroidal lens 12 may have two cylindrical surfaces with differing powers, or it may be made of a glass cylindrical lens as long as the coupling state of the emitted light from the coupling lens 2 is adjusted.

A third optical system 60 that includes resin lenses 61 and 62 compensates for the field curvatures in the main scanning direction and the sub scanning direction as well as optical characteristics such as fθ, and focuses the rays deflected by the light deflector 5 onto a surface to be scanned 7 while securing a desired sub scanning beam pitch on the surface to be scanned 7. Note that in the drawing, the parts indicated by numerals 10a, 11a, 12a, 61a, and 62a correspond to the planes of incidence of the resin lenses 10, 11, the glass toroidal lens 12, and the resin lenses 61, 62, respectively. Also, the parts indicated by numerals 10b, 11b, 12b, 61b, and 62b correspond to exit surfaces of the resin lenses 10, 11, the glass toroidal lens 12, and the resin lenses 61, 62, respectively.

In the following, a change in the beam pitch due to a change in temperature will be described.

Figure 3:
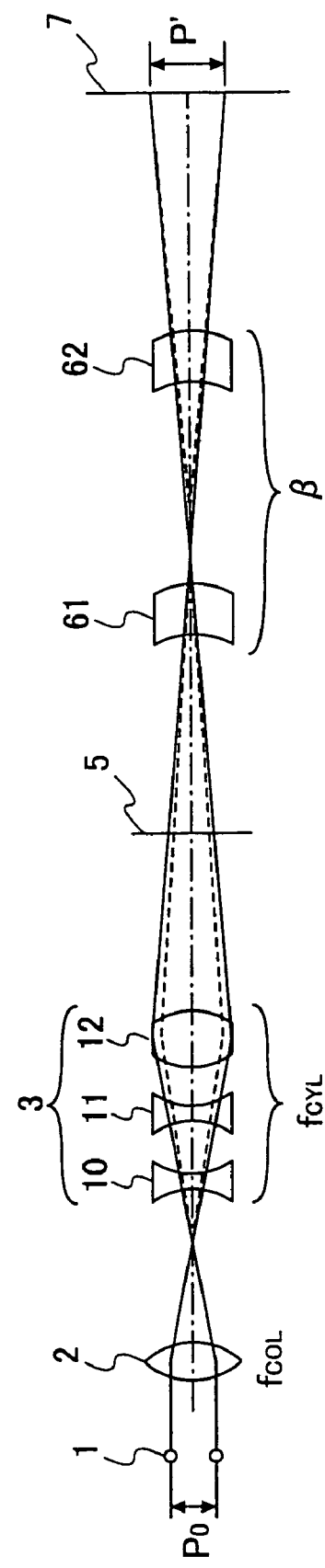
FIG. 3 is a schematic diagram showing the light path of principal rays in the sub scanning direction in the optical scanning device shown in FIGS. 2A and 2B.

First, in FIG. 3 the beam pitch P' on the image surface 7 can be expressed by the following formula:

$$P' = P_0 \times Fcyl/Fcol \times \beta$$

wherein $P_0$ denotes the beam spacing in the sub scanning direction at the light source 1, Fcol denotes the focal length of the first optical system, Fcyl denotes the focal length of the second optical system 3 that includes the resin lenses 10, 11, and the glass toroidal lens 12, and β denotes the lateral magnification in the sub scanning direction of the third optical system 60.

Since the change of $P_0$, Fcol, and Fcyl due to temperature change is trivial and can be disregarded, the change in the beam pitch can be described in relation to the change in the lateral magnification of the third optical system 60 made up of the resin lenses 61 and 62. That is, the change in the lateral magnification in the sub scanning direction of the third optical system 60 due to temperature change is directly reflected in the change of the beam pitch.

FIG. 3 shows a light path of principal rays in the sub scanning direction of the optical scanning apparatus shown in FIGS. 2A and 2B.

As described above, the resin lenses 10 and 11 of the second optical system 3 have negative powers in the sub scanning direction. Thus, with an increase in the temperature, the focal distance Fcyl of the second optical system 3 becomes shorter and this causes the beam pitch to be narrower. In the third optical system 60, the focal distance increases with the increase in temperature, thereby causing the beam pitch to increase. In this way, the change in the beam pitch is balanced out on the whole.

It is preferable that the powers of the surfaces of the imaging elements (lenses) of the second optical system 3 be arranged so as to be capable of completely compensating for the change in the beam pitch in the sub scanning direction caused by the temperature change in the first optical system and/or the third optical system 60; however, setting the powers to satisfy the following formula will suffice for practical purposes.

$$\Delta P' < 0.5/DPI \text{ (mm/°C.)}$$

Herein, $\Delta P'$ denotes the change in the sub scanning beam pitch on the image surface 7 for every 1° C. temperature change (mm/° C.), and DPI denotes the write density (dots/inch).

When $\Delta P'$ exceeds 0.5/DPI, image degradation such as unevenness in density occurs. For example, if the write density is 1200 dpi (beam pitch: 21.2 µm), the design temperature is 25° C., and the temperature can rise up to 45° C., the following value is obtained:

$$0.5/1200 \times 20 = 8.3 \text{ (µm)}$$

This will cause a problem in the image.

Note that in the embodiment using the LDA that has a plurality of emission points as the light source, the change in the spacing of the light source in the sub scanning direction $P_0$ due to temperature change can be disregarded. However, if a plurality laser diodes are used as light sources with the rays synthesized by a prism, the beam spacing in the sub scanning direction, which corresponds to the interval of the laser diodes, may possibly change in response to temperature change depending on the mounting structure of the laser diodes. Therefore, it is preferable that the LDA having a plurality of emission points is used.

In the following, definition formulas of the surface configurations of the lenses in the present embodiment are shown.

Main Scanning Non-Curvature Formula

The surface in the main scanning surface forms a non-curvature configuration. Given that Rm denotes the paraxial curvature radius, Y denotes the distance from the optical axis in the main scanning direction, K denotes the conical constant, A1, A2, A3, A4, A5, A6, . . . denote the constants of the first and the higher order variables, and X denotes the depth in the optical axis direction, the following formula can be obtained.

$$X = (Y^2/Rm)/[1+ \sqrt{\{1-(1+k)(Y/Rm)^2\}}] + A1 \cdot Y + A2 \cdot Y^2 + A3 \cdot Y^3 + A4 \cdot Y^4 + A5 \cdot Y^5 + A6 \cdot Y^6 +)$$

Herein, when a value other than 0 is substituted for the coefficients A1, A3, A5 . . . , which are the coefficients for Y that are powered by uneven numbers, an asymmetrical configuration is realized in the main scanning direction. That is, when a value other than 0 is substituted only for the even numbered coefficients, symmetry is realized in the main scanning direction.

Sub Scanning Curvature Formula

The change in the sub scanning curvature in accordance with the main scanning direction is expressed by a formula (2) indicated below:

$$Cs(Y) = 1/Rs(0) + B1 \cdot Y + B2 \cdot Y^2 + B3 \cdot Y^3 + B4 \cdot Y^4 + B5 \cdot Y^5 + \quad (2)$$

Sub Scanning Non-Curvature Formula $$X(Y,Z) = \frac{C_m Y^2}{1+\sqrt{1-(1+K)C_m^2 Y^2}} + \sum_{n=1}^{p} a_n Y^n +$$

$$\frac{C_S(Y)Z^2}{1+\sqrt{1-(1+K_Z(Y))C_S^2(Y)Z^2}} + \sum_{j=1}^{r}\left(\sum_{h=0}^{q} d_{j,h} Y^h\right) Z^j$$

Herein, the formula shown below:

$$f_{SAG}(Y,Z) = \sum_{j=1}^{r}\left(\sum_{h=0}^{q} d_{j,h} Y^h\right) Z^j$$

can be broken down into the following:

$$f_{SAG}(Y,Z) = (F0 + F1 \cdot Y + F2 \cdot Y^2 + F3 \cdot Y^3 + F4 \cdot Y^4 + \ldots) \cdot Z +$$
$$(G0 + G1 \cdot Y + G2 \cdot Y^2 + G3 \cdot Y^3 + G4 \cdot Y^4 + \ldots) \cdot Z^2 +$$
$$(H0 + H1 \cdot Y + H2 \cdot Y^2 + H3 \cdot Y^3 + H4 \cdot Y^4 + \ldots) \cdot Z^3 +$$
$$(I0 + I1 \cdot Y + I2 \cdot Y^2 + I3 \cdot Y^3 + I4 \cdot Y^4 + \ldots) \cdot Z^4 +$$
$$(J0 + J1 \cdot Y + J2 \cdot Y^2 + J3 \cdot Y^3 + J4 \cdot Y^4 + \ldots) \cdot Z^5 + \ldots +$$

Herein, Y denotes the main scanning direction, Z denotes the sub scanning direction, Cm or 1/Rm denotes the paraxial curvature in the main scanning direction around the optical axis, Cs(0) or 1/Rs(0) denotes the paraxial curvature in the sub scanning direction around the optical axis, Cs(Y) denotes the paraxial curvature in the sub scanning direction at a position Y in the main scanning direction, Kz(Y) denotes the conical constant representing the secondary curvature surface in the sub scanning direction at the position Y in the main scanning direction, and $f_{SAG}(Y,Z)$ denotes the high-order aspheric compensation value, wherein:

$$Cs = 1/Rs0 + B1 \cdot Y + B2 \cdot Y^2 + B3 \cdot Y^3 + B4 \cdot Y^4 + B5 \cdot Y^5 + \ldots$$

$$Kz = C0 + C1 \cdot Y + C2 \cdot Y^2 + C3 \cdot Y^3 + C4 \cdot Y^4 + C5 \cdot Y^5 + \ldots$$

Note that when a value other than 0 is substituted for the coefficients B1, B3, B5 . . . , which are the coefficients for Y to the power of uneven numbers, the curvature radius in the sub scanning direction will be asymmetrical to the main scanning direction.

Similarly, when a value other than 0 is substituted for the coefficients C1, C3, C5 . . . , F1, F3, F5 . . . , G1, G3, G5 . . . , which are the coefficients for Y to the power of uneven numbers representing the non-curvature values, the non-curvature values in the sub scanning direction will be asymmetrical to the main scanning direction.

(Embodiment 1)

Figure 1:
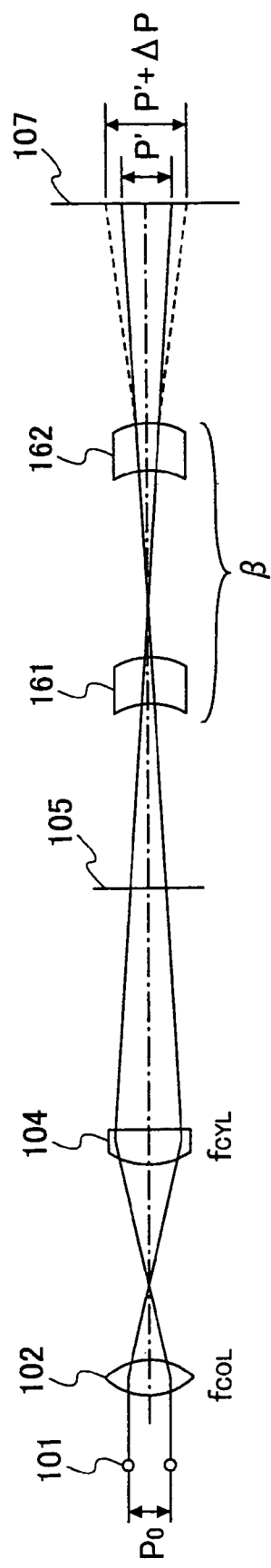
FIG. 1 is a schematic diagram showing the light path of principal rays in the sub scanning direction in an optical scanning device according to the related art.

In the following, the change in the beam pitch in the optical scanning device shown in FIG. 1 obtained from the above formulas describing the surface configurations are given.

'Light Source'

14 µm-pitch 4-channel LDA wavelength: 780 nm slanting angle: 12.39°

'Coupling Lens' focal length: 27 mm
coupling effect: collimating effect
'Polygon Mirror'
number of reflective surfaces: 5
in-circle radius: 18 mm
 Angle formed between the incident angle of the beam emitted from the light source and the optical axis of the scanning
optical system: 60°
 Write width: +150 mm
 Field angle: ±38°
 Write density: 1200 dpi
$d1$=3 mm, $d2$=9.2 mm, $d3$=3 mm, $d4$=8.15 mm, $d5$=6 mm, $d6$=114 mm,
Curvature radius of the surface of incidence $10a$ of the resin lens $10$: −119.97 mm (spherical);
Curvature radius of the exit surface $10b$ of the resin lens $10$: ∞ (main scanning) and 16.4 mm (sub scanning);
Curvature radius of the surface of incidence $11a$ of the resin lens $11$: ∞ (main scanning) and −16 mm (sub scanning);
Curvature radius of the exit surface $11b$ of the resin lens $11$: ∞ (main scanning) and 18.03 mm (sub scanning);
Curvature radius of the surface of incidence $12a$ of the glass toroidal lens $12$: 1.0E+08 (main scanning) and 13.54 mm (sub scanning non-curvature surface)
Curvature radius of the exit surface $12b$ of the glass toroidal lens $12$: −186 mm (spherical).
Configuration of the surface of incidence $12a$ of the glass toroidal lens $12$:
Rm=1.00+08, Rs=13.54,
A04 −1.167576−07,
A06 1.236756−11,
C00 −8.413895−01,
C02 −7.014231−04,
C04 7.664337−05,
C06 7.406181−06,
C08 −8.915899−08,
I00 −5.984409−05,
I02 −9.295456−08,
I04 −1.267730−08,
I06 1.645283−10,
I08 −5.745329−12,
K00 1.108638−07,
K02 1.241363−08,
K04 −9.523815−11,
K08 6.477626−11,
Reflective index of the resin lenses $10$ and $11$: 1.523978 (when λ=780 nm, temperature=25° C.);
Line expansion coefficient of the resin lenses $10$ and $11$: $7 \times 10^{-5}$;
Refractive index of the glass toroidal lens $12$: 1.733278 (when λ=780 nm, temperature=25° C.);
Line expansion coefficient of the glass toroidal lens: $5.4 \times 10^{-6}$;
Line expansion coefficient of the lens mounting member (base member): $2.3 \times 10^{-5}$;
$d7$=71.6 mm, $d8$=30 mm, $d9$=66.3 mm, $d10$=8.5 mm, $d11$=159.3 mm, $d12$=0.2 mm, $d13$=0.2 mm,
Refractive index of the resin scanning lenses $61$ and $62$: 1.523978 (when λ=780 nm, temperature=25° C.)
Line expansion coefficient of the resin scanning lenses $61$ and $62$: $7 \times 10^{-5}$;
Configuration of the surface of incidence $61a$ of the resin scanning lens $61$:
Rm=−1030.233346, Rs=−89.518927,
A00 −4.041619E+02,
A04 6.005017E−08,
A06 −7.538155E−13,
A08 −4.036824E−16,
A10 4.592164E−20,
A12 −2.396524E−24,
B01 −9.317851E−06,
B02 3.269905E−06,
B03 4.132497E−09,
B04 −4.207716E−10,
B05 −1.170114E−12,
B06 4.370640E−14,
B07 2.347965E−16,
B08 −6.212795E−18,
B09 −3.967994E−20,
B10 −3.873869E−21,
B11 3.816823E−24,
B12 4.535843E−25,
Configuration of the exit surface $61b$ of the resin scanning lens $61$:
Rm=−109.082474, Rs=−110.881332,
A00 −5.427642E−01,
A04 9.539024E−08,
A06 4.882194E−13,
A08 −1.198993E−16,
A10 5.029989E−20,
A12 −5.654269E−24,
B02 −3.652575E−07,
B04 2.336762E−11,
B06 8.426224E−14,
B08 −1.026127E−17,
B10 −2.202344E−21,
B12 1.224555E−26,
Configuration of the surface of incidence $62a$ of the resin scanning lens $62$:
Rm=1493.654587, Rs=−70.072432,
A00 5.479389E+01,
A04 −7.606757E−09,
A06 −6.311203E−13,
A08 6.133813E−17,
A10 −1.482144E−21,
A12 2.429275E−26,
A14 −1.688771E−30,
B02 −8.701573E−08,
B04 2.829315E−11,
B06 −1.930080E−15,
B08 2.766862E−20,
B10 2.176995E−24,
B12 −6.107799E−29,
Configuration of the exit surface $62b$ of the resin scanning lens $62$ (sub scanning non-curvature surface):
Rm=1748.583900, Rs=−28.034612,
A00 −5.488740E+02,
A04 −4.978348E−08,
A06 2.325104E−12,
A08 −7.619465E−17,
A10 3.322730E−21,
A12 −3.571328E−26,
A14 −2.198782E−30,
B01 −1.440188E−06,
B02 4.696142E−07,
B03 1.853999E−11,
B04 −4.153092E−11,
B05 −8.494278E−16,
B06 2.193172E−15,
B07 9.003631E−19,
B08 −9.271637E−21,
B09 −1.328111E−22,
B10 −1.409647E−24, B11 5.520183E−27,
B12 4.513104E−30,
C00 −9.999999E−01,
I00 −1.320849E−07,
I02 −1.087674E−11,
I04 −9.022577E−16,
I06 −7.344134E−20,
K00 9.396622E−09,
K02 1.148840E−12,
K04 8.063518E−17,
K06 −1.473844E−20, FIG. 4 shows a relationship between the image height and the scanning line position in the optical scanning device shown in FIG. 2B based on the results obtained in embodiment 1. In this drawing, the scanning line positions of channels 1 through 4 at temperatures of 25° C. and 45° C. are shown. At 25° C., the beam pitch between the channels is 21.2 μm, and at 45° C., the beam pitch is 20.7 μm. That is, the change in the beam pitch is kept under control to a mere 0.5 μm.

Figure 5A:
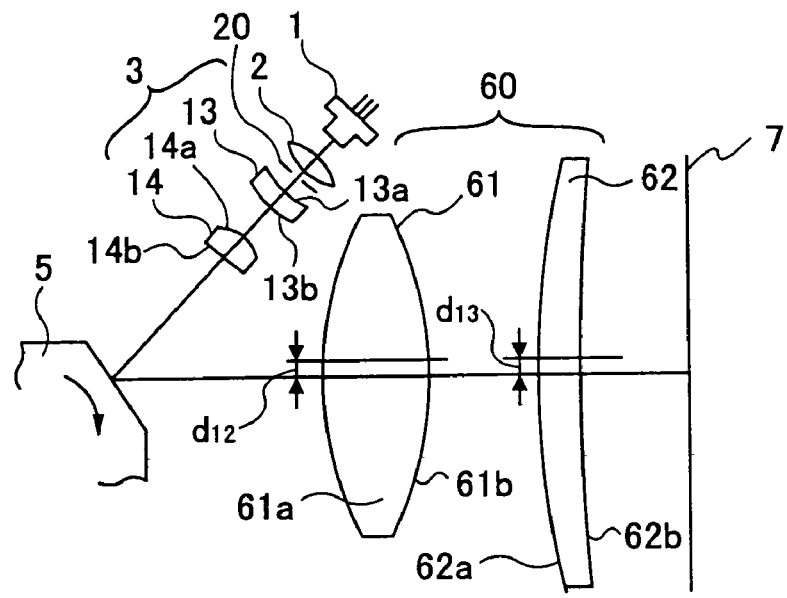
FIGS. 5A and 5B show an optical scanning device according to another embodiment of the present invention.
Figure 5B:
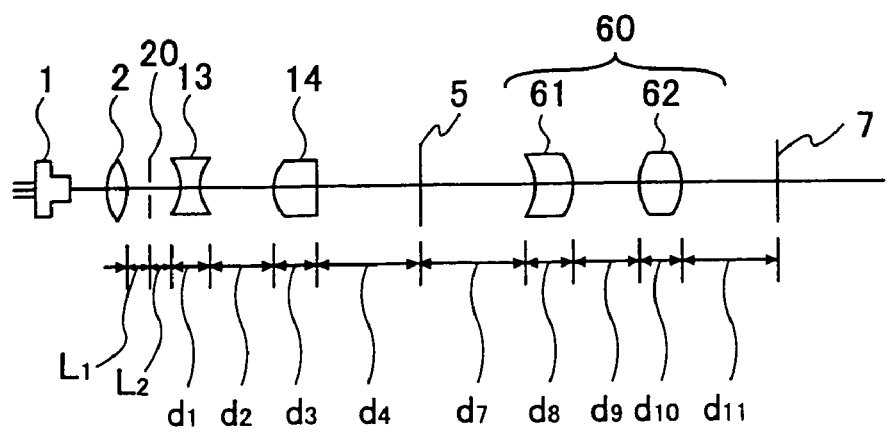

FIGS. 5A and 5B are diagrams showing an optical scanning apparatus according to another embodiment of the present invention, wherein FIG. 5A shows a schematic view of the optical scanning device, and FIG. 5B shows a side view (optical path) of the same optical scanning device. A bundle of rays emitted from the light source 1 that has a plurality of emission points are coupled into diverging rays by the coupling lens 2 of the first optical system. The coupling lens 2 has a coaxial aspherical surface and the wave aberration of the bundle of rays emitted from the coupling lens 2 is suitably compensated for. The bundle of rays emitted from the coupling lens pass through an aperture stop 20 to obtain a desired beam spot diameter on the surface to be scanned 7, then, this is incident on a resin lens 13 of the second optical system 3. A surface of incidence 13a of the resin lens 13 has negative powers that differ for each of the main scanning direction and the sub scanning direction. More specifically, the resin lens 13 is an anamorphic lens that has greater power in the sub scanning direction. Next, the bundle of rays emitted from the resin lens 13 is incident on a glass toroidal lens 14 of the second optical system 3. Herein, the rays become substantially parallel in the main scanning direction and are incident on the light deflector 5. Also, in the sub scanning direction, the bundle of rays is condensed substantially into a line extending along the main scanning direction on the deflection surface of the deflector. The glass toroidal lens 14 may have a spherical surface and a cylindrical surface. The third optical system 60 that includes the resin scanning lenses 61 and 62 compensates for the field curvature in the main scanning direction and the sub scanning direction and optical characteristics such as fθ and focuses the bundle of rays deflected by the light deflector 5 onto the surface to be scanned 7. In the present example, the resin lenses 61 and 62 have functions of imaging parallel rays in the main scanning direction.

Also, prior to exposure of the valid write width, a synchronous detection is performed. The write process starts after a fixed period of time from the completion of the synchronous detection. At this point, the write process starting positions of the plurality of beams need to be synchronized. Therefore, the bundle of rays is preferably condensed on the synchronous detection element at least in the main scanning direction.

Herein, the changes in field curvature due to temperature change of the resin imaging elements (resin scanning lenses) 61 and 62 in the third optical system 60 are compensated for by the negative powers of the resin lens 13 of the second optical system 3. Specifically, the change in field curvature in the main scanning direction is compensated for by the power in the main scanning direction of the surface of incidence 13a of the resin lens 13, and the change in field curvature in the sub scanning direction is compensated for by the power in the sub scanning direction of the surface of incidence 13a and the power of the exit surface 13b of the resin lens 13.

Because the power in the sub scanning direction is dispersed onto two surfaces, the curvature radius can be increased compared to an embodiment in which the power in the sub scanning direction is dispersed only on one surface. Note that in the drawing, 13a, 14a, 61a, and 62a represent the planes of incidence of the resin lens 13, the glass toroidal lens 14, and the resin scanning lenses 61 and 62, respectively, and 13b, 14b, 61b, and 62b represent the exit surfaces of the resin lens 13, the glass toroidal lens 14, and the resin scanning lenses 61 and 62, respectively.

Figure 6A:
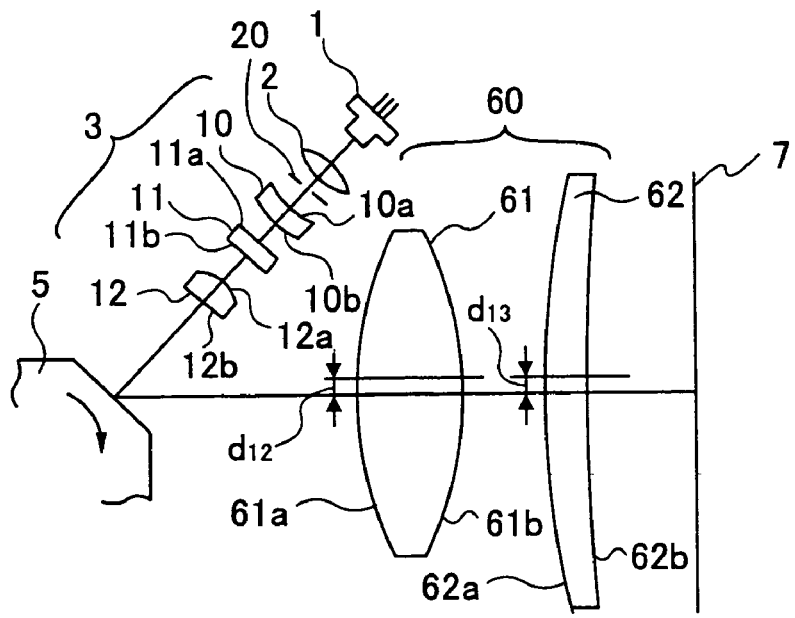
FIGS. 6A and 6B show an optical scanning device according to an embodiment of the present invention in which a power in the sub scanning direction is dispersed onto three surfaces.
Figure 6B:
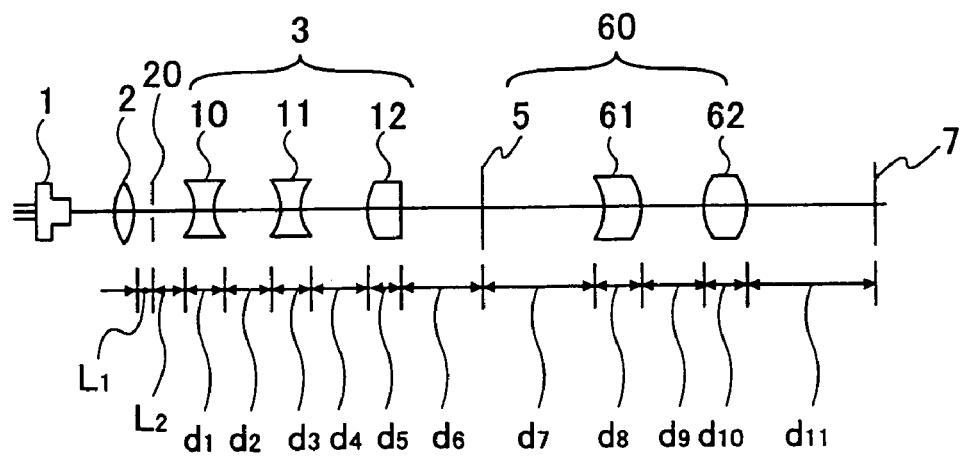

FIGS. 6A and 6B are diagrams for illustrating an optical scanning device according to another embodiment of the present invention in which the power in the sub scanning direction is dispersed onto three surfaces. FIG. 6A shows a schematic view of the optical scanning device, and FIG. 6B shows a side view (optical path) of the same optical scanning device. According to this embodiment, the power in the sub scanning direction of the second optical system 3 is dispersed onto three surfaces; thereby, the curvature radius can be enhanced even further. In this optical scanning device, the bundle of rays that has passed through the first optical system made up of the coupling lens 2 is converted into diverging rays by the resin lens 10 that has a power in the main scanning direction. A positive refractive power is provided in the main scanning direction of the second optical system 3 made up of the resin lens 10 having a power in the main scanning direction, the resin lens 11 having a power in the sub scanning direction, and the glass toroidal lens 12 so that the bundle of rays in the main scanning direction passing through the second optical system can be converted from diverging rays to substantially parallel rays. As a result, the focus point of the bundle of rays (the imaging point of the substantially parallel rays) and the intersecting point of the principal rays (the intersecting point of the parallel rays) will meet at substantially the same point. Thereby, the dot displacements in the main scanning direction can be prevented when the surface to be scanned is adjusted to the focus point.

Also, the image height at the beginning of the write process and the image height at the end of the write process are substantially the same even when the angles at the deflection surface of the deflector (in this example, the reflection angles of the light deflector 5) are different. Thus, it is possible to maintain consistency in the write width (the scanning width) of the beams, and unevenness in image density, and distortion of vertical lines can be prevented.

As mentioned above, the resin lens 10 has a power in the main scanning direction. Thus, by moving the resin lens 10 in the optical axis direction, the misplacement of a beam waist in the main scanning direction caused by a processing error of the third optical system 60 and the like can be adjusted and fixed to be positioned substantially on the surface to be scanned 7.

Also, the resin lens 11 and the glass toroidal lens 12 have powers in the sub scanning direction. Thus, by moving the resin lens 11 in the optical axis direction, the misplacement of the beam waist in the sub scanning direction caused by a processing error of the third optical system 60 and the like can be adjusted and fixed to be positioned substantially on the surface to be scanned 7.

The resin lens 10 may have different negative powers in the main scanning direction and in the sub scanning direction. In this case, even when the beam waist is misplaced in the sub scanning direction by moving the resin lens 10 in the optical axis direction and adjusting the misplacement of the beam waist in the main scanning direction to be positioned substantially on the surface to be scanned 7, the resin lens 11 can be used to adjust and fix this misplacement of the beam waist in the sub scanning direction to be substantially positioned on the surface to be scanned 7 since the resin lens 11 has a power only in the sub scanning direction. Note that in the drawing, 10a, 11a, 12a, 61a, and 62a represent the planes of incidence of the resin lens 10, 11, the glass toroidal lens 12, and the resin scanning lenses 61 and 62, respectively, and 10b, 11b, 12b, 61b, and 62b represent the exit surfaces of the resin lens 10, 11, the glass toroidal lens 12, and the resin scanning lenses 61 and 62, respectively.

In the following, further improvements (1 through 3) that can be made by coupling the bundle of rays passing through the first optical system into diverging rays rather than coupling them into parallel rays as in the first embodiment (FIGS. 2A, 2B, and FIG. 3) will be described with reference to FIGS. 7A, 7B, 8A, and 8B.

Figure 7A:
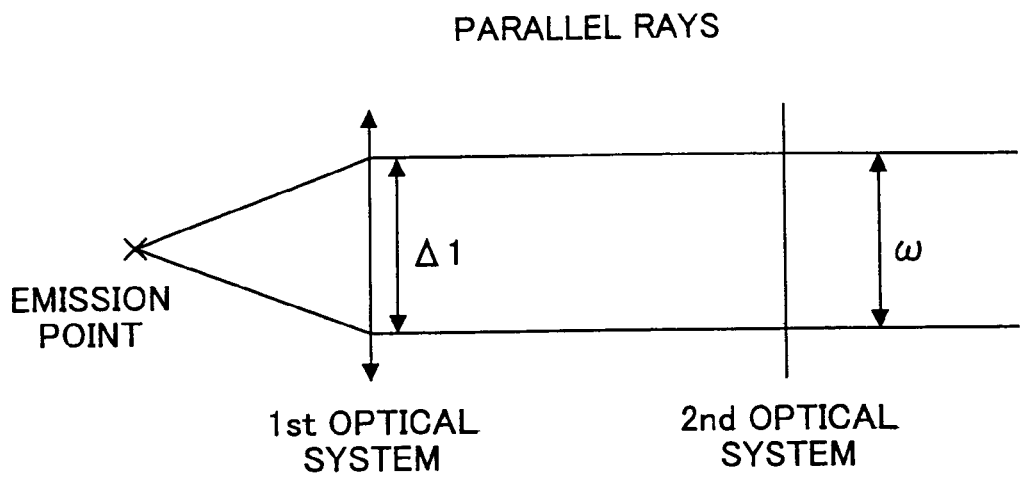
FIGS. 7A and 7B show examples of light ray bundles emitted from an emission point and passing through a first optical system and a second optical system in an optical scanning device that converts the rays passing through the first optical system into parallel rays, and in an optical scanning device that converts the rays passing through the first optical system into diverging rays.
Figure 7B:
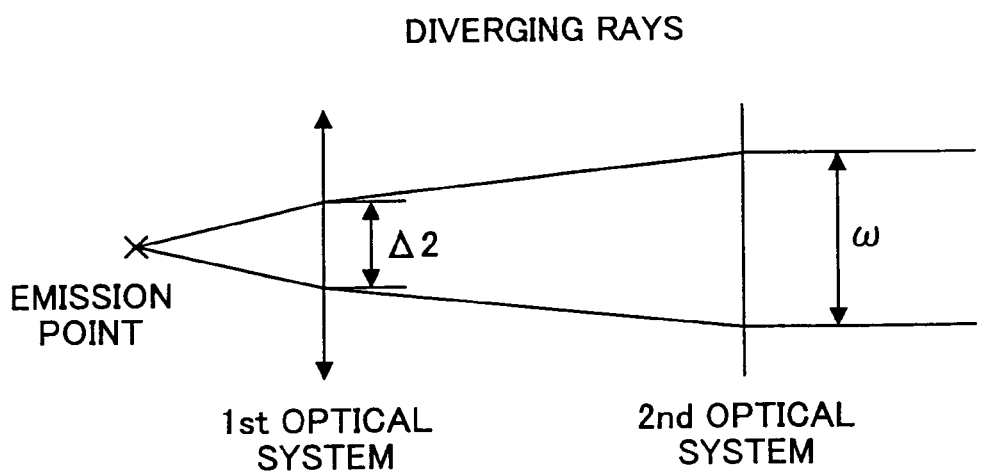

FIGS. 7A and 7B show examples of a bundle of rays emitted from an emission point that pass through the first optical system and the second optical system. FIG. 7A shows the bundle of rays in the optical scanning apparatus that converts the rays passing through the first optical system into parallel rays, and FIG. 7B shows the bundle of rays in the optical scanning apparatus that converts the rays passing through the first optical system into diverging rays.

1. To obtain equivalent beam spot diameters in the two different optical scanning devices, a measurement ω shown in FIGS. 7A and 7B needs to be fixed. In this case, the effective diameter of the coupling lens 2 (effective diameter of the rays) Δ2 in the embodiment in which the rays emitted from a semiconductor laser array having a plurality of emission points and passing through the coupling lens are converted into diverging rays is smaller compared with the effective ray diameter Δ1 in the embodiment in which the rays are converted into parallel rays. Thus, by making the outer diameter of the lens smaller, the size and cost of the optical scanning device can be reduced, and by having a small effective diameter of the rays, the wave aberration can be suitably adjusted and the optical performance can be improved.

Figure 8A:
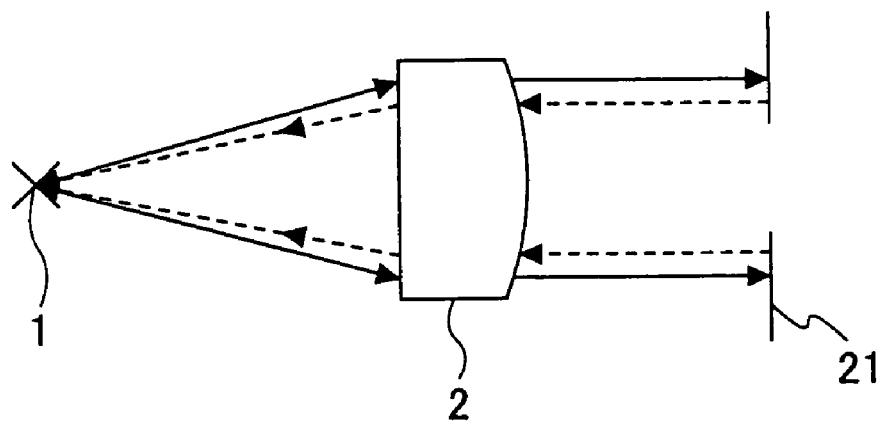
FIGS. 8A and 8B show examples of light ray bundles between the emission point and an aperture stop in an optical scanning device that converts the rays passing through the first optical system into parallel rays and in an optical scanning device that converts the rays passing through the first optical system into diverging rays.
Figure 8B:
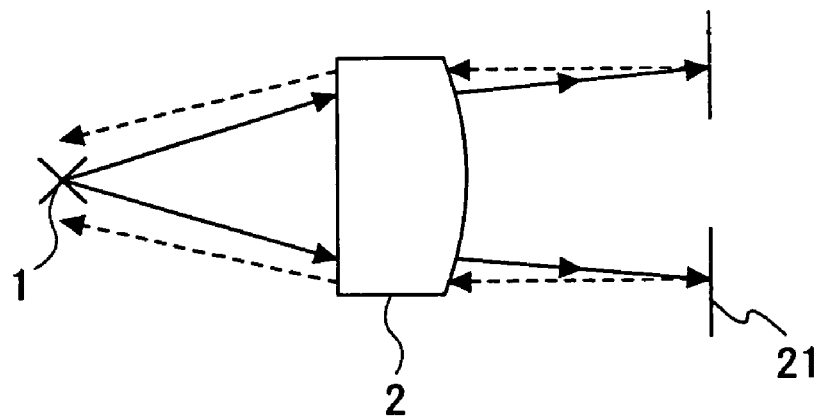

FIGS. 8A and 8B show examples of light ray bundles between the emission point and the aperture stop. FIG. 8A shows the bundle of rays in the optical scanning device that converts the rays passing through the first optical system into parallel rays, and FIG. 8B shows the bundle of rays in the optical scanning device that converts the rays passing through the first optical system into diverging rays.

2. Normally, a bundle of rays, emitted from a semiconductor laser array having a plurality of emission points and passed through the coupling lens, is converted into parallel rays. However, in such a case, ghost light reflected from the aperture stop 21 is condensed and directed back to the emission point 1 as shown in FIG. 7A; thereby possibly creating instability in the intensity of the emitted light. The instability in light intensity can cause unevenness in the image density. Thus, by converting the rays passing through the coupling lens 2 into diverging rays, as shown in FIG. 8B, the ghost light reflected by the aperture stop 21 can be prevented from being condensed and directed back to the emission point. Also, a stable light intensity can be obtained, thereby preventing the generation of unevenness in image density.

3. In the optical scanning device that converts a bundle of rays into diverging rays, the magnification in the sub scanning direction can be lowered, and the degradation of the beam spacing in the sub scanning direction on the surface to be scanned 7 as a result of a change in the emission point position (emission point spacing) caused by such factors as the mounting of the light source device or a change in temperature can be reduced.

On the other hand, the spacing of the scanning line on the surface to be scanned needs to be set to a value according to the pixel density. Given that Pls denotes the emission point spacing in the sub scanning direction, Ps denotes the scanning line spacing on the surface to be scanned, and β denotes the lateral magnification in the sub scanning direction between the light source and the surface to be scanned, the scanning line spacing Ps can be set in accordance with the following formula:

$$Ps = Pls \times \beta$$

Thus, to set the scanning line spacing to a value that corresponds to a high pixel density, (21.2 μm in the case of 1200 dpi), either the lateral magnification in the sub scanning direction between the light source and the surface to be scanned (β) needs to be reduced or the emission point spacing in the sub scanning direction (Pls) needs to be reduced. However, if the lateral magnification in the sub scanning direction between the light source and the surface to be scanned (β) is reduced, the aperture diameter in the sub scanning direction will also be reduced, thereby lowering the light usage efficiency so that sufficient light will not reach the surface to be scanned. On the other hand, the reduction of the emission point spacing in the sub scanning direction (Pls) is generally limited to a dozen or so μm in order to avoid influences from thermal cross talk and the like. Thus, it is preferable that the plurality of emission points be arranged so that the line of emission points are inclined with respect to the sub scanning direction within a plane that is perpendicular to the optical axis.

By using the optical scanning device with an inclined semiconductor laser array, the scanning line spacing can be set to a value corresponding to a high density (for example, the spacing can be set to 21.2 μm for a density of 1200 dpi).

Further, by providing a positive refractive power in the main scanning direction of the second optical system so that the bundle of rays passing through the second optical system is converted into substantially parallel rays in the main scanning direction, the focal point (the imaging point of the substantially parallel rays) and the intersecting point of the principal rays (the intersecting point of the parallel rays) meet at substantially the same point. Thus, when the surface to be scanned is adjusted to the focus spot, the displacement of dots in the main scanning direction can also be accurately controlled. Further, the image height at the start of the write process and the image height at the end of the write process are the same height even when the angles at the deflection surface of the deflector (e.g. the reflection angles of the polygon mirror) are different. Therefore, the write width of each of the beams (scanning width) can be arranged to be consistent, and unevenness in density and distortion of the vertical lines can be avoided.

Figure 9:
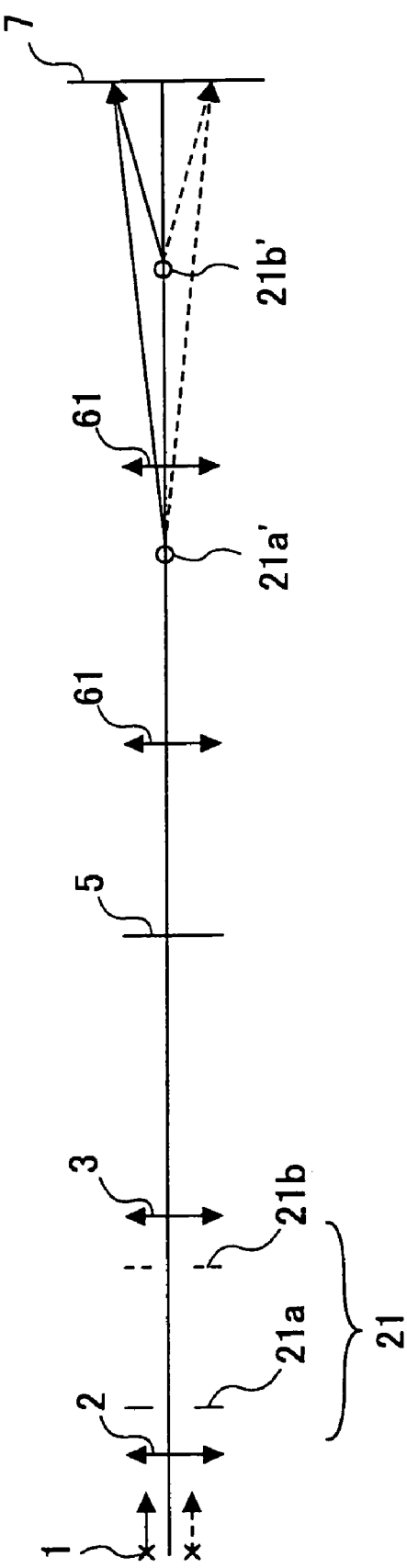
FIG. 9 shows a cross-sectional view in the sub scanning direction of the optical scanning device of the present invention wherein a distribution of the lens power and positions of the aperture stop are illustrated.

FIG. 9 is a cross-sectional view in the sub scanning direction of the optical scanning device according to the present invention showing the lens power distribution and aperture positions. In the drawing, the aperture stop 21 is arranged between the first optical system and the second optical system. Given that L1 denotes the distance from an optical element of the first optical system that is arranged closest to the second optical system to the aperture stop 21, and L2 denotes the distance from the aperture stop 21 to an optical element of the second optical system that is arranged closest to the light source, when L1<L2, the distance between a conjugate point of the aperture stop 21 in the sub scanning direction and the surface to be scanned 7 becomes longer. In the drawing, an aperture stop 21a is arranged within a range that satisfies the condition L1<L2, and an aperture stop 21b is arranged within a range that satisfies the condition L1>L2.

The aperture stop 21 functions as an entrance pupil of the optical system starting from its position and onward. Thus, the plurality of beams advance toward the surface to be scanned, at different angles from the conjugate point. When the conjugate point is close to the surface to be scanned, as in a conjugate point 21b' of the aperture stop 21b, the plurality of beams advancing toward the surface to be scanned, will have relatively large angles, and the scanning line spacing will differ for each image height depending on the field curvature in the sub scanning direction. Also, when the conjugate point is close to the surface to be scanned 7, the depth of the beam spot diameter in the sub scanning direction will be greatly influenced by diffraction, and thereby less flexibility will be allowed.

On the other hand, when the conjugate point is arranged to satisfy the condition L1<L2 as in the conjugate point 21a' of the aperture stop 21, the distance between the conjugate point 21a' of the aperture stop 21a and the surface to be scanned 7 will be greater compared to that between the conjugate point 21b' of the aperture stop 21b and the surface to be scanned 7, and the scanning line spacing corresponding to each of the image heights formed by a plurality of beams become consistent. Also, the influence from diffraction can be reduced, thereby allowing more flexibility in the depth of the beam spot diameter in the sub scanning direction.

Figure 10:
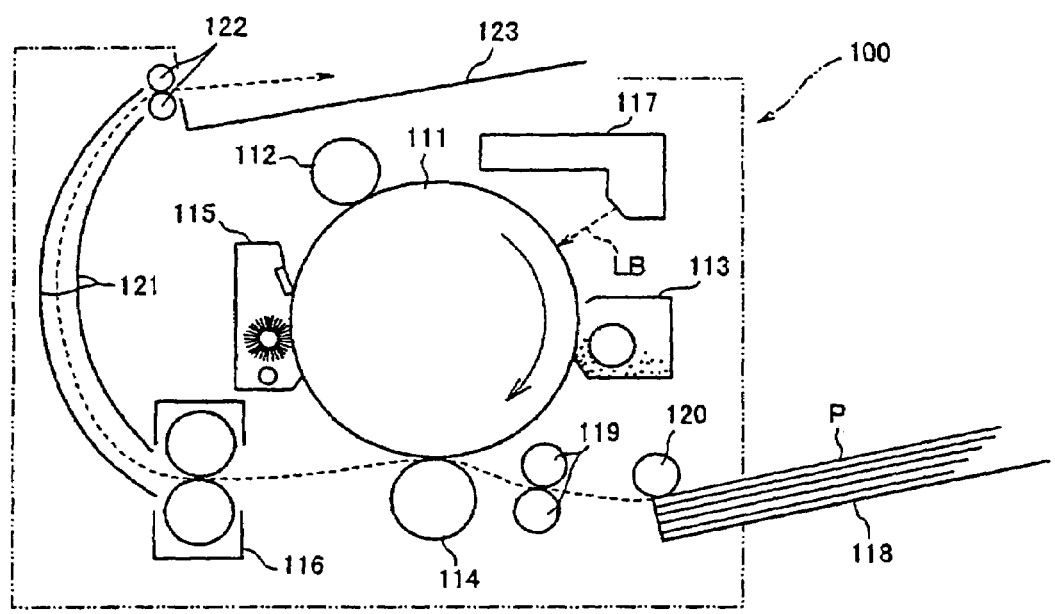
FIG. 10 is a diagram of a laser printer illustrated as an example of an imaging apparatus that implements the optical scanning device of the present invention.

FIG. 10 is a diagram of a laser printer as an example of an imaging apparatus that implements the scanning device of the present invention. The laser printer 100 in this drawing has a latent image holder 111, which is a light conductive photoconductor formed into a cylindrical shape. In the vicinity of the latent image holder 111, a charge roller 112, which is charging means, a developing device 113, a transfer roller 114, and a cleaning device 115 are implemented. A corona charger may be used as the charging device. Also, an optical scanning device 117 that scans an image using laser beams (LB) so as to realize 'exposure by optical writing' between the charge roller 112 and the developing device 113 is implemented. Further, the laser printer 100 includes a fixing device 116, a cassette 118, a pair of resist rollers 119, a paper feed roller 120, a carrier path 121, a pair of delivery rollers 122, a tray 123, and transfer paper P as the recording medium.

In an imaging process of the laser printer 100, the latent image holder 111 rotates clockwise at a constant pace, and its surface is evenly charged by the charge roller 112. This surface is then exposed by the optical writing of the laser beams (LB) from the optical scanning device 117 and an electrostatic latent image is formed thereon. This electrostatic latent image is the so-called 'negative latent image' and its image portion is exposed. Then, the developing device 113 performs reversal development on this electrostatic latent image and a toner image is formed on the latent image holder 111.

The cassette 118 holding the transfer paper P is detachably arranged to the laser printer body 100. When this cassette 118 is fixed to the laser printer body 100 as in the drawing, the uppermost sheet of transfer paper P in the cassette 118 is fed to the paper feed roller 120. Then the pair of resist rollers 119 catches the leading tip of this transfer paper P entering the laser printer 100. The pair of resist rollers 119 sends this transfer paper P into a transfer unit at a suitable timing in accordance with the time at which the toner image on the latent image holder 111 is moved to a transfer position. The transfer paper P and the toner image meet at the transfer unit, and an electrostatic transfer of the toner image is realized by means of the transfer roller 114. The transfer paper P with the toner image transferred thereon is sent to the fixing device 116, wherein the toner image is fixed. Then, the transfer paper P passes through the carrier path 121 and is delivered onto the tray 123 by means of the pair of delivery rollers 122.

The surface of the latent image holder 111 is cleaned at the cleaning device 115 after the completion of the transferring of the toner image so that undesirable substances such as residual toner particles and paper dust are removed.

The imaging apparatus 100 that forms a latent image on a latent image holder 111 through optical scanning and acquires a desired recorded image by making the above latent image visible implements the scanning device according to the present invention for performing the optical scanning on the latent image holder 111. More specifically, the latent image holder 111 is a light conductive photoconductor on which electricity is evenly charged and optical scanning is performed to form an electrostatic latent image, this electrostatic latent image being made visible as a toner image.

(Embodiment 2)

In the following, the change in the beam spot diameter in the optical scanning device shown in FIGS. 5A and 5B obtained from the above formulas describing the surface configurations are given.

'Light Source'

14 μm-pitch 4-channel LDA wavelength: 780 nm inclination angle: 50.68°

'Coupling Lens' focal length: 27 mm coupling effect: diverging effect

'Polygon Mirror' number of reflective surfaces: 5 in-circle radius: 18 mm

Angle formed between the incident angle of the beam emitted from the light source and the optical axis of the scanning optical system: 60°

Write width: ±150 mm

Field angle: ±38°

Write density: 1200 dpi

L1=8 mm, L2=39.4 mm, d1=3 mm, d2=20.35 mm, d3=6 mm, d4=138.5 mm,

Curvature radius of the surface of incidence 13a of the resin lens 13: −135.34 mm (main scanning) and −30 mm (sub scanning);

Curvature radius of the exit surface 13b of the resin lens 13: ∞ (main scanning) and 20 mm (sub scanning);

Curvature radius of the surface of incidence 14a of the glass toroidal lens 14: ∞ (main scanning) and 27.561 mm (sub scanning);

Curvature radius of the exit surface 14b of the glass toroidal lens 14: −200 mm (spherical surface);

Refractive index of the resin lens 13: 1.523978 (when λ=780 nm, and temperature=25° C.)
Line expansion coefficient of the resin lens 13: $7\times10^{-5}$,
Refractive index of the glass toroidal lens 14: 1.733109 (when λ=780 nm, and temperature=25° C.)
Line expansion coefficient of the glass toroidal lens 14: $5.4\times10^{-6}$,
Line expansion coefficient of the lens mounting part (base member): $2.31\times10^{-5}$,
d7=71.6 mm, d8=30 mm, d9=66.3 mm, d10=8.5 mm, d11=159.3 mm, d12=0.2 mm, d13=0.2 mm,
Refractive index of the resin scanning lenses 61 and 62: 1.523978 (when λ=780 nm, and temperature=25° C.)
Line expansion coefficient of the resin lenses 61 and 62: $7\times10^{-5}$,
Configuration of the surface of incidence 61a of the resin scanning lens 61:
Rm=−1030.233346, Rs=−89.518927,
A00 −4.041619E+02,
A04 6.005017E−08,
A06 −7.538155E−13,
A08 −4.036824E−16,
A10 4.592164E−20,
A12 −2.396524E−24
B01 −9.317851E−06,
B02 3.269905E−06,
B03 4.132497E−09,
B04 −4.207716E−10,
B05 −1.170114E−12,
B06 4.370640E−14
B07 2.347965E−16
B08 −6.212795E−18
B09 −3.967994E−20
B10 −3.873869E−21
B11 3.816823E−24
B12 4.535843E−25
Configuration of the surface of incidence 61a of the resin scanning lens 61 is as follows:
Rm=−1030.233346, Rs=−89.518927,
A00 −4.041619E+02,
A04 6.005017E−08,
A06 −7.538155E−13,
A08 −4.036824E−16,
A10 4.592164E−20,
A12 −2.396524E−24,
B01 −9.317851E−06,
B02 3.269905E−06,
B03 4.132497E−09,
B04 −4.207716E−10,
B05 −1.170114E−12,
B06 4.370640E−14,
B07 2.347965E−16,
B08 −6.212795E−18,
B09 −3.967994E−20,
B10 −3.873869E−21,
B11 3.816823E−24,
B12 4.535843E−25,
Configuration of the exit surface 61b of the resin scanning lens 61:
Rm=−109.082474, Rs=−110.881332,
A00 −5.427642E−01,
A04 9.539024E−08,
A06 4.882194E−13,
A08 −1.198993E−16,
A10 5.029989E−20,
A12 −5.654269E−24,
B02 −3.652575E−07,
B04 2.336762E−11,
B06 8.426224E−14,
B08 −1.026127E−17,
B10 −2.202344E−21,
B12 1.224555E−26,
Configuration of the surface of incidence 62a of the resin scanning lens 62:
Rm=1493.654587, Rs=−70.072432,
A00 5.479389E+01,
A04 −7.606757E−09,
A06 −6.311203E−13,
A08 6.133813E−17,
A10 −1.482144E−21,
A12 2.429275E−26,
A14 −1.688771E−30,
B02 −8.701573E−08,
B04 2.829315E−11,
B06 −1.930080E−15,
B08 2.766862E−20,
B10 2.176995E−24,
B12 −6.107799E−29,
Configuration of the exit surface 61b of the resin scanning lens 61 (sub scanning direction, non-curvature surface):
Rm=1748.583900, Rs=−28.034612,
A00 −5.488740E+02,
A04 −4.978348E−08,
A06 2.325104E−12,
A08 −7.619465E−17,
A10 3.322730E−21,
A12 −3.571328E−26,
A14 −2.198782E−30,
B01 −1.440188E−06,
B02 4.696142E−07,
B03 1.853999E−11,
B04 −4.153092E−11,
B05 −8.494278E−16,
B06 2.193172E−15,
B07 9.003631E−19,
B08 −9.271637E−21,
B09 −1.328111E−22,
B10 −1.409647E−24,
B11 5.520183E−27,
B12 4.513104E−30,
C00 −9.999999E−01,
I00 −1.320849E−07,
I02 −1.087674E−11,
I04 −9.022577E−16,
I06 −7.344134E−20,
K00 9.396622E−09,
K02 1.148840E−12,
K04 8.063518E−17,
K06 −1.473844E−20,
(Embodiment 3)

In the following, the change in the beam spot diameter in the optical scanning device shown in FIGS. 5A and 5B obtained from the above formulas describing the surface configurations are given.

'Light Source'
14 μm-pitch 4-channel LDA
wavelength: 780 nm
slanting angle: 10.457°
'Coupling Lens'
focal length: 27 mm
coupling effect: diverging effect
'Polygon Mirror'
number of reflective surfaces: 5
in-circle radius: 18 mm Angle formed between the incident angle of the beam emitted from the light source and the optical axis of the scanning optical system: 60°
Write width: ±150 mm
Field angle: ±38°
Write density: 1200 dpi
L1=8 mm, L2=39.4 mm, d1=3 mm, d2=9.2 mm, d3=3 mm, d4=8.15 mm, d5=6 mm, d6=115.7 mm,
Curvature radius of the surface of incidence 10a of the resin lens 10: −119.97 mm (spherical);
Curvature radius of the exit surface 10b of the resin lens 10: ∞ (main scanning) and 16.4 mm (sub scanning);
Curvature radius of the surface of incidence 11a of the resin lens 11: ∞ (main scanning) and −16 mm (sub scanning);
Curvature radius of the exit surface 11b of the resin lens 11: ∞ (main scanning) and 18.03 mm (sub scanning);
Curvature radius of the surface of incidence 12a of the glass toroidal lens 12: 1.0E+08 (main scanning) and 13.568 mm (sub scanning direction, non-curvature surface)
Curvature radius of the exit surface 12b of the glass toroidal lens 12: −179.47 mm (spherical).
Configuration of the surface of incidence 12a of the glass toroidal lens 12:
Rm=1.00+08, Rs=13.568,
A04 −1.167576−07,
A06 1.236756−11,
C00 −8.413895−01,
C02 −7.014231−04,
C04 7.664337−05,
C06 7.406181−06,
C08 −8.915899−08,
I00 −5.984409−05,
I02 −9.295456−08,
I04 −1.267730−08,
I06 1.645283−10,
I08 −5.745329−12,
K00 1.108638−07,
K02 1.241363−08,
K04 −9.523815−11,
K08 6.477626−11,
Reflective index of the resin lenses 10 and 11: 1.523978 (when λ=780 nm, temperature=25° C.);
Line expansion coefficient of the resin lenses 10 and 11: 7×10$^{-5}$;
Refractive index of the glass toroidal lens 12: 1.733109 (when λ=780 nm, temperature=25° C.);
Line expansion coefficient of the glass toroidal lens 12: 5.4×10$^{-6}$;
Line expansion coefficient of the lens mounting member (base member): 2.31×10$^{-5}$;
d7=71.6 mm, d8=30 mm, d9=66.3 mm, d10=8.5 mm, d11=159.3 mm, d12=0.2 mm, d13=0.2 mm,
Refractive index of the resin scanning lenses 61 and 62: 1.523978 (when λ=780 nm, temperature=25° C.)
Line expansion coefficient of the resin scanning lenses 61 and 62: 7×10$^{-5}$;
Configuration of the surface of incidence 61a of the resin scanning lens 61:
Rm=−1030.233346, Rs=−89.518927,
A00 −4.041619E+02,
A04 6.005017E−08,
A06 −7.538155E−13,
A08 −4.036824E−16,
A10 4.592164E−20,
A12 −2.396524E−24,
B01 −9.317851E−06,
B02 3.269905E−06,
B03 4.132497E−09,
B04 −4.207716E−10,
B05 −1.170114E−12,
B06 4.370640E−14,
B07 2.347965E−16,
B08 −6.212795E−18,
B09 −3.967994E−20,
B10 −3.873869E−21,
B11 3.816823E−24,
B12 4.535843E−25,
Configuration of the exit surface 61b of the resin scanning lens 61:
Rm=−109.082474, Rs=−110.881332,
A00 −5.427642E−01,
A04 9.539024E−08,
A06 4.882194E−13,
A08 −1.198993E−16,
A10 5.029989E−20,
A12 −5.654269E−24,
B02 −3.652575E−07,
B04 2.336762E−11,
B06 8.426224E−14,
B08 −1.026127E−17,
B10 −2.202344E−21,
B12 1.224555E−26,
Configuration of the surface of incidence 62a of the resin scanning lens 62:
Rm=1493.654587, Rs=−70.072432,
A00 5.479389E+01,
A04 −7.606757E−09,
A06 −6.311203E−13,
A08 6.133813E−17,
A10 −1.482144E−21,
A12 2.429275E−26,
A14 −1.688771E−30,
B02 −8.701573E−08,
B04 2.829315E−11,
B06 −1.930080E−15,
B08 2.766862E−20,
B10 2.176995E−24,
B12 −6.107799E−29,
Configuration of the exit surface 61b of the resin scanning lens 61 (sub scanning direction, non-curvature surface):
Rm=1748.583900, Rs=−28.034612,
A00 −5.488740E+02,
A04 −4.978348E−08,
A06 2.325104E−12,
A08 −7.619465E−17,
A10 3.322730E−21,
A12 −3.571328E−26,
A14 −2.198782E−30,
B01 −1.440188E−06,
B02 4.696142E−07,
B03 1.853999E−11,
B04 −4.153092E−11,
B05 −8.494278E−16,
B06 2.193172E−15,
B07 9.003631E−19,
B08 −9.271637E−21,
B09 −1.328111E−22,
B10 −1.409647E−24,
B11 5.520183E−27,
B12 4.513104E−30,
C00 −9.999999E−01,
I00 −1.320849E−07,
I02 −1.087674E−11,
I04 −9.022577E−16, I06 −7.344134E−20,
K00 9.396622E−09,
K02 1.148840E−12,
K04 8.063518E−17,
K06 −1.473844E−20

Note that although not shown in the drawing, a soundproof glass with a thickness of 1.9 mm (refractive index: 1.511) and a dustproof glass also with a thickness of 1.9 mm (refractive index: 1.511) are inserted in the optical scanning device. The soundproof glass is mounted with an inclination of 8° within the deflection surface, and the dustproof glass is mounted with an inclination of 20° within the sub scanning cross-sectional surface. Also, the diverging angles of the laser diode array (LDA) as half angles are $\theta\perp=30°$ and $\theta//=9°$, and the aperture is arranged on the diverging rays at a position that satisfies the condition L1<L2 so that the field depth of the beam spot can be within a sufficiently wide range.

Summing up the results obtained in the above, by setting the aperture diameter to 6.4 (main scanning)×1.8 (sub scanning) in embodiment 2, a stable beam spot diameter can be obtained for each image height as indicated in table 1 shown below.

TABLE 1

| Image Height (mm) | −150 | 0 | 150 |
|---|---|---|---|
| Main Scanning | 38 μm | 37 μm | 38 μm |
| Sub Scanning | 39 μm | 39 μm | 39 μm |

Also, by setting the aperture diameter to 8 (main scanning)×1.6 (sub scanning) in embodiment 3, a stable beam spot diameter can be obtained for each image height as indicated in table 2 shown below.

TABLE 2

| Image Height (mm) | −150 | 0 | 150 |
|---|---|---|---|
| Main Scanning | 29 μm | 28 μm | 29 μm |
| Sub Scanning | 28 μm | 28 μm | 28 μm |

In the above description of the preferred embodiments, a semiconductor laser array is used as the light source having a plurality of emission points; however, the present invention is not limited to implementing this particular type of light source and variations and modifications are possible without departing from the scope of the present invention. For example, the light source having a plurality of emission points may be created by the synthesis of rays using a prism and the like.

According to the present invention, even when a resin lens is used as the scanning lens, a change in the beam pitch due to environmental temperature change can be controlled.

Also, by arranging the surface configuration of at least one of the resin imaging elements in the second optical system to effectively compensate for a field curvature change due to temperature change at a support member of the first optical system and/or at the resin imaging element of the third optical system, image degradation such as displacement of dots in the main scanning direction or unevenness in image density and distortion of the vertical lines due to the difference in the write width (scanning width) of each beam can be reduced even if the bundle of rays passing through the coupling optical system is converted into diverging rays and the magnification in the sub scanning direction is lowered. Further, compared to the conventional art in which the misplacement of the imaging position is compensated for and the misplacement of the imaging position is mechanically adjusted, the present invention enables cost reduction as well as a reduction of power consumption. By reducing the size of the outer diameter of the lens, the size of the optical scanning device can be reduced and thereby costs can also be reduced. Also, since the effective diameter is reduced, wave aberration can be compensated for and the optical characteristics can be improved. Further, when an aperture stop is arranged between the first optical system and the light deflector, ghost light reflected by the deflector is prevented from being condensed and directed back to the emission point. Thus, a stable light intensity can be obtained and the generation of unevenness in density can be prevented.

The present application is based on and claims the benefit of the earlier filing date of Japanese priority application No. 2002-129741 filed on May 1, 2002, the entire contents of which are hereby incorporated by reference.

What is claimed is:

1. A multi-beam optical scanning device, comprising:
a light source having a plurality of emission points that emit a bundle of rays;
a first optical system that couples the bundle of rays emitted from the light source into a bundle of diverging rays;
a second optical system that condenses the bundle of diverging rays from the first optical system into a substantially linear state extending along a main scanning direction;
a light deflector that has a deflection surface arranged close to where the bundle of linear rays is condensed, wherein the bundle of linear rays is deflected by said deflection surface;
an aperture stop arranged between the first optical system and the light deflector;
a third optical system that condenses the deflected bundle of rays onto a surface to be scanned as a plurality of light spots; wherein
the third optical system has at least one resin imaging element;
the second optical system has a plurality of imaging elements including a resin imaging element and a glass imaging element;
at least one of the resin imaging elements of the second optical system has a negative power in a sub scanning direction and a surface configuration that is arranged to effectively compensate for a change in field curvature caused by a temperature change in at least one of a support member of the first optical system and the resin imaging element of the third optical system;
the second optical system as a whole has a positive power in the main scanning direction;
at least one of the resin imaging elements of the second optical system has a power in the main scanning direction, and is positioned so that a beam waist in the main scanning direction is substantially positioned on the surface to be scanned; and
said at least one of the imaging elements of the second optical system has power only in the main scanning direction.

2. The optical scanning device as claimed in claim 1, wherein at least one of the resin imaging elements of the second optical system has a negative power in the main scanning direction.

3. The optical scanning device as claimed in claim 1, wherein the bundle of rays emitted from the second optical system is a bundle of substantially parallel rays in the main scanning direction.

4. The optical scanning device as claimed in claim 1, wherein said emission points of the light source are spaced out in the main scanning direction.

5. The optical scanning device as claimed in claim 1, wherein the aperture stop is arranged between the first optical system and the second optical system and satisfies a condition:

L1<L2 wherein L1 denotes a distance from an optical element of the first optical system that is closest to the light deflector to the aperture stop, and L2 denotes a distance from the aperture stop to an optical element of the second optical system closest to the light source.

6. The optical scanning device as claimed in claim 1, wherein the resin imaging element of the second optical system has at least two surfaces that have negative powers in the sub scanning direction, said surfaces being configured to effectively compensate for the change in field curvature caused by a temperature change in at least one of a support member of the first optical system and the resin imaging element in the third optical system.

7. The optical scanning device as claimed in claim 1, wherein the second optical system has at least two of the resin imaging elements that have negative powers in the sub scanning direction.

8. The optical scanning device as claimed in claim 1, wherein the light source is a laser diode array that has a plurality of emission points.

9. The optical scanning device as claimed in claim 1, wherein at least one of the resin imaging elements of the second optical system has a power in the sub scanning direction, and is positioned so that a beam waist in the sub scanning direction is substantially positioned on the surface to be scanned.

10. The optical scanning device as claimed in claim 9, wherein said at least one of the imaging elements of the second optical system has power only in the sub scanning direction.

11. An imaging apparatus comprising a multi-beam optical scanning device that includes:

a light source having a plurality of emission points that emit a bundle of rays;

a first optical system that couples the bundle of rays from the light source into a bundle of diverging rays;

a second optical system that condenses the bundle of rays coming from the first optical system into a substantially linear state along a main scanning direction;

a light deflector that has a defection surface arranged close to where the bundle of rays is condensed, wherein the bundle of rays is deflected by said deflection surface;

an aperture stop arranged between the first optical system and the light deflector;

a third optical system that condenses the deflected bundle of rays onto a surface to be scanned as a plurality of light spots; wherein the third optical system has at least one resin imaging element;

the second optical system has a plurality of imaging elements including a resin imaging element and a glass imaging element;

at least one of the resin imaging elements of the second optical system has a negative power in a sub scanning direction and a surface configuration that is arranged to effectively compensate for a change in field curvature caused by a temperature change in at least one of a support member of the first optical system and the resin imaging element of the third optical system;

the second optical system as a whole has a positive power in the main scanning direction;

at least one of the resin imaging elements of the second optical system has a power in the main scanning direction, and is positioned so that a beam waist in the main scanning direction is substantially positioned on the surface to be scanned; and said at least one of the imaging elements of the second optical system has power only in the main scanning direction.

* * * * *